INVENTORS

Isao Kozu

Osamu Ogata

BY

Stevens, Davis, Miller & Mosher

ATTORNEYS

PHONOGRAPH PICKUP APPARATUS

Filed May 19, 1965 2 Sheets-Sheet 2

INVENTORS
Isao Kozu
Osamu Ogata

BY
Stevens, Davis, Miller & Mosher
ATTORNEYS

United States Patent Office 3,363,909

Patented Jan. 16, 1968

3,363,909

PHONOGRAPH PICKUP APPARATUS

Isao Kozu, Osaka, and Osamu Ogata, Moriguchi-shi, Japan, assignors to Matsushita Electric Industrial Co., Ltd., Osaka, Japan, a corporation of Japan Filed May 19, 1965, Ser. No. 457,107

Claims priority, application Japan, May 19, 1964, 39/39,055; May 20, 1964, 39/39,439; June 1, 1964, 39/43,563; Sept. 17, 1964, 39/74,216; Nov. 20, 1964, 39/90,495; Dec. 14, 1964, 39/96,624, 39/96,625; Apr. 6, 1965, 40/20,952

6 Claims. (Cl. 274—23)

ABSTRACT OF THE DISCLOSURE

A phonograph recording playing apparatus utilizing straight line tracking in which any inclination of the tone arm is corrected by moving a carriage pivotally supporting the tone arm by the component of the reaction force of a rotary cylinder given to a roller carried by the carriage and depressed against the upper portion of the rotary cylinder.

This invention relates to phonograph, and more particularly, to phonograph pickup apparatus.

In conventional phonograph constructions, a phonograph pickup is mounted on an arm which is pivotally secured at one end thereof to a fixed support, so that the needle can trace the record groove forming an arc. The angle between the longitudinal center line of the pickup and the tangent line of the groove at the point contacted by the needle changes as the needle travels and these changes in the said angle would cause tracking errors. These tracking errors, in turn, would cause tracking distortions.

Offset arms are commonly used to reduce the tracking errors, but they tend to bring forth an inside force which will impose an undesirable side pressure to the needle against the surfaces of the groove.

Various attempts have been made to eliminate tracking errors. A tone arm, supported on a carriage which is adapted to move only sideways on a ball bearing, for example, will not produce tracking errors, but a tone arm of this type is subjected to a greater amount of friction than is a conventional pivoted tone arm. This will mean that the transverse pressure inflicted upon both the needle and the record groove is intensified and would cause the needle to leap off the record groove. This is the reason why such a tracking errorless phonograph pickup with a very small vertical force in the order of one gram has not been made into practical use yet.

An object of the present invention, therefore, is to provide a pickup support which is of a simplified construction and by which the needle makes a straight-lined travel from one edge of the record to the center thereof.

Another object of the present invention is to provide a pickup support which can make smooth movement by a force other than the pressure to be delivered upon the needle by the lead of the spiral record groove.

Still another object of the present invention is to provide a carriage for supporting a tone arm which is made operative by a rotating cylinder and a roller.

Still another object of the present invention is to provide guide means for the carriage to make smooth movement.

A further object of the present invention is to provide a means to rotate said cylinder without increasing the vibration generated by a driving motor and transmitted to the pickup.

Another object of the present invention is to eliminate the vibration generated at the bearings of both the cylinder and the roller.

Still another object of the present invention is to provide a means to support the roller which is connected to the tone arm.

Still another object of the present invention is to provide a tone arm whose weight balance may be adjusted by a simple means.

Other objects and advantages of the present invention may be more clearly understood by reference to the following detailed description including modified embodiments when considered with the drawings in which.

Figures 1, 2:
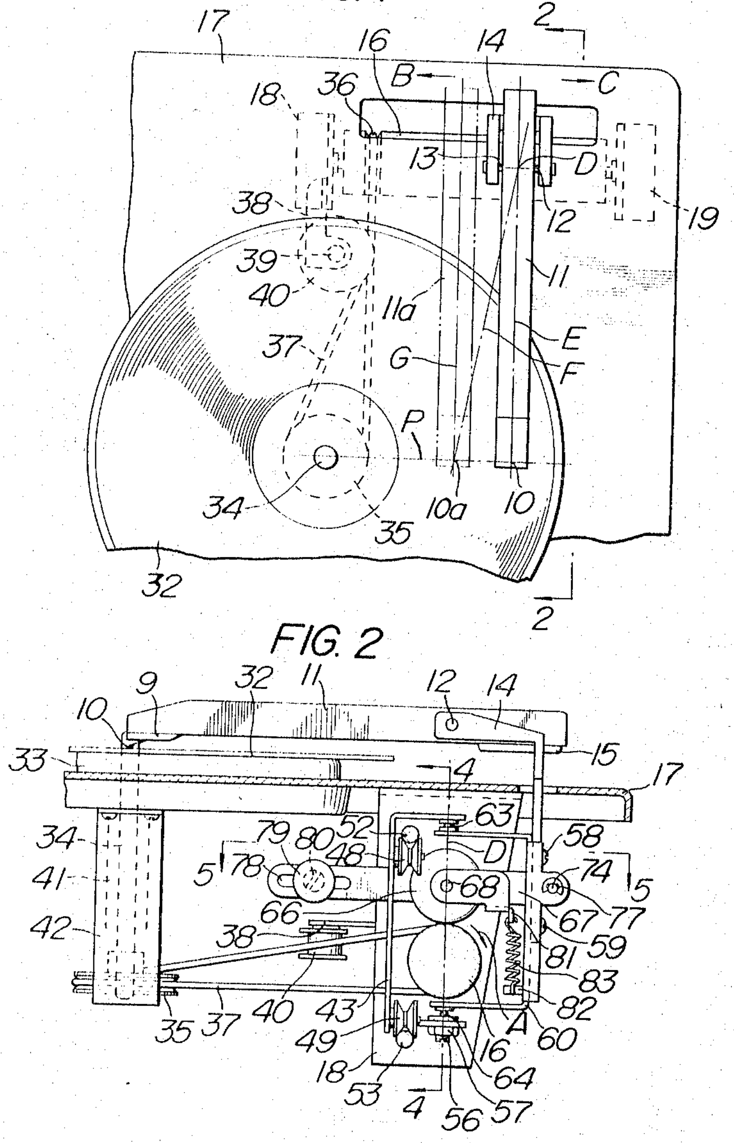
FIG. 1 is a plan view of one embodiment of the present invention.
FIG. 2 is a vertical sectional view taken along the line 2—2 of FIG. 1.

With respect to FIG. 1 and FIG. 2 of the drawings, a needle 10 of a pickup 9 is mounted to a tone arm 11, the tone arm 11 is supported by a bracket 14 for vertical pivotal movement by means of pins 12, 13 and is balanced by a counter-weight 15 in such manner that the needle 10 may receive an appropriate vertical force.

A cylinder 16 is rotatably supported by side plates 18, 19 which are securely fixed to a chassis 17. To explain the construction of this part of apparatus in more detail, the side plate 19 has, fixed thereto, a threaded hub 20 into which a screw 21 having a conically recessed end is fixed by means of a nut 22. The side plate 18 has secured thereto by means of screws 25, 26 a plate 24 to which a conically recessed step bearing 23 is fixed. The step bearing 23 is movably inserted into an opening 27 of the side plate 18. The cylinder 16 is provided at opposite ends thereof with conically recessed portions 28, 29. Two steel balls 30, 31 are interposed between the recess 28 and the screw 21, and between the recess 29 and the step bearing 23, respectively. When assembling, the screw 21 is adjusted to insure smooth rotation of the cylinder 16 before being set by the nut 22.

The cylinder 16 is at all times rotatable in the direction of the arrow A by an endless rope 37 provided between a V-shaped pulley 35 secured to a spindle 34 of a turntable 33 on which a record 32 is mounted and an annular groove 36 having a V-shaped cross-section provided on said cylinder 16. Said endless rope 37 is guided by a guide pulley 40 which is rotatable about a fixed shaft 39 of a bracket 38 secured to the side plate 18 to prevent said rope 37 from slipping off the said V-shaped pulley 35 and/or the V-shaped groove 36 of the cylinder 16.

The radial load imposed upon a spindle shaft 34 is supported by a bearing 41 secured to the chassis 17 and the load in the direction of the thrust which is inflicted upon said bearing 41 is, in turn, supported by a U-shaped support 42 secured to the chassis 17.

Figure 3:
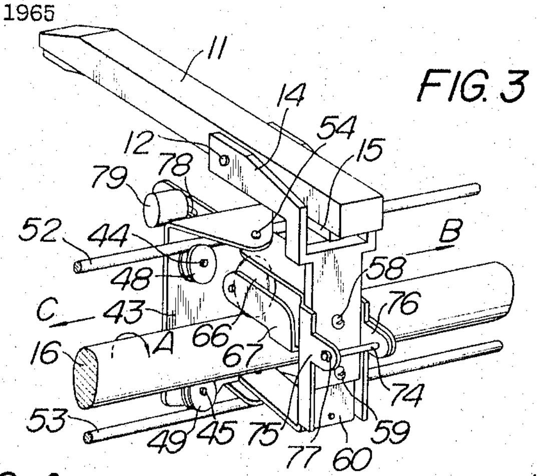
FIG. 3 is a perspective view of a tone arm assembly of the present invention.
Figure 4:
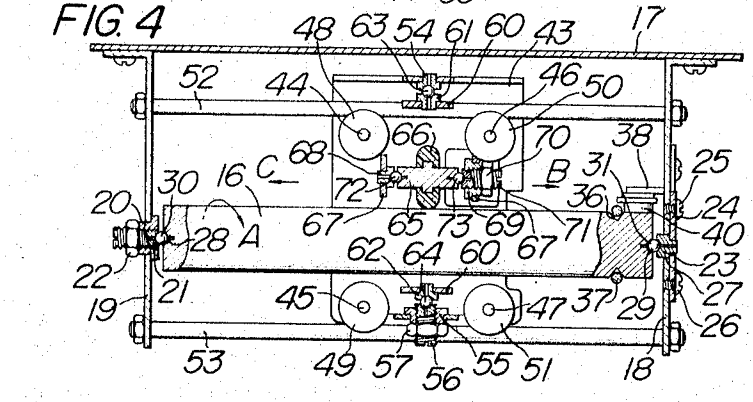
FIG. 4 is a vertical sectional view taken along the line 4—4 of FIG. 2.

In FIG. 3 and FIG. 4 of the drawings, a carriage 43 is guided by four guide rollers 48, 49, 50, 51 which are rotatable about four corresponding shafts 44, 45, 46, 47 each fixed to the said carriage 43 and also by two guide bars 52, 53 provided between the side plates 18, 19, thereby enabling the said carriage to move in the direction of either the arrow B or the arrow C. A step bearing 54 having a conically recessed end is fixed to the upper plate portion of the carriage 43, and a threaded hub 55 is fixed to the lower plate portion of the same. A screw 56 having a conically recessed end is set in said hub 55 by means of a nut 57. The bracket 14 supporting the tone arm 11 is secured to another bracket 60 by screws 58, 59. Step bearings 61, 62 each having a conically recessed end are fixed to the upper and the lower plate portions of the bracket 60, respectively. Between the step bearings 61, 62, the step bearing 54 and the screw 56 are interposed two steel balls 63, 64, respectively. In assembling, the screw 56 is adjusted to permit the bracket 60 to make smooth rotation about the vertical axis denoted by the dot-dash line D (FIG. 2) before being set by means of the nut 57.

A roller 66, which is made of rubber, for example, is attached to a shaft 65 having conical recessed ends. This shaft 65 is held by a step bearing 68 having a conical recessed end and fixed to one side of an arm 67, a screw 71 having a conically recessed end and set by means of a nut 70 in a threaded hub 69 which, in turn, is fixed to the other side of the said arm 67, and also by two steel balls 72, 73. The said roller 66 is adapted to make smooth rotation by adjusting said screw 71.

Figure 5:
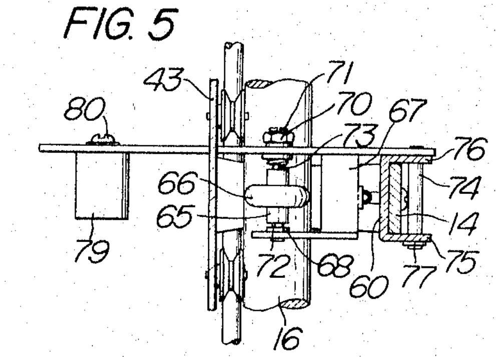
FIG. 5 is a partial cross-sectional view taken along the line 5—5 of FIG. 2; and, FIG. 6 is a cross-sectional view of a roller assembly of a modified form of the present invention.

In FIG. 2, FIG. 3 and FIG. 5, the arm 67 is fixed at one end thereof to a shaft 74 rotatably attached to the bent portions 75, 76 of the bracket 60 by means of a half-moon shaped retainer 77, thereby permitting vertical pivotal movement of the said arm 67. Also, the arm 67 is provided at the other end thereof with an elongated slot 78 in which is fixed, by means of a screw 80, a balance weight 79 in such manner that the weight may be moved along said slot 78 for the purpose of adjustment. The roller 66 is pressed down against the upper surface of the cylinder 16 by an appropriate force of a spring 83 provided between a tab 81 of the arm 67 and a pin 82 secured to the bracket 60, thereby the roller 66 will rotate by the friction generated therebetween. The roller 66 and the tone arm 11 are arranged so that the rotation axis of the roller 66 will be perpendicular to the line denoted by a dot-dash line E in FIG. 1 drawn between the needle 10 and the center of the rotation axis (denoted by a dot-dash line D in FIG. 2) of the tone arm 11. The tone arm 11, the brackets 14, 60, the arm 67 and the roller 66 are so constructed that these members may rotate as a single unit. The resistance that these members will obtain during their rotation represents the friction between the steel balls 63, 64 and the step bearings 54, 61 plus the friction between the roller 66 and the cylinder 16. The former friction may be reduced by the use of the step bearings 54, 61, 62 and the screw 56 both made of a hard material such as steel. The latter friction may be limited to the rolling friction alone by positioning the point of contact of the roller 66 with the rotatory cylinder 16 at a position above the dot-dash line D, thereby minimizing the resistance. Thus, the smooth rotation of the tone arm 11 may be achieved.

Since the balance weight 79 is adjusted so that the tone arm 11, the counter-weight 15, the brackets 14, 60, the arm 67 and the roller 66 may be balanced about the dot-dash line D, even if the chassis 17 is supported at an inclined position, the needle 10 will not receive any undesirable side pressure at all.

Since the apparatus of the present invention is of such construction as have been described in the above, when the needle 10 which is placed on the record groove travels to the position indicated by 10*a* due to the lead of the record groove, the tone arm 11 becomes inclined, that is, the dot-dash line E will move to the position of the dot-dash line F. This will incline the rotation axis of the roller 66 with respect to the rotation axis of the cylinder 16. Since the cylinder 16 is rotating in the direction of the arrow A (FIG. 2 and FIG. 3), the roller 66 will receive a component of rotation force in the direction of the arrow B from the cylinder 16. As a result, the carriage will move in the direction of the arrow B along the guide bars 52, 53, and the dot-dash line F will come to join the dot-dash line G which is perpendicular to the rotation axis of the cylinder 16. In other words, upon the arrival of the tone arm 11 to the position 11*a*, the carriage will cease its movement. At this moment, the rotation axes of both the roller 66 and the cylinder 16 are disposed in parallel relation to each other.

As the needle 10 makes gradual and continuous travel along the spiral record groove, the carriage 43 also makes gradual and continuous movement in the direction of the arrow B in such manner that the dot-dash line between the needle 10 and the rotation axis (denoted by the dot-dash line D) may be constantly held at right angle with the rotation axis of the cylinder 16, and therefore, the needle 10 will travel on a track as denoted by the radial line P. This means that tracking error is absent at all times. In addition, since the carriage 43 is transferred by a force other than the pressure inflicted upon the needle 10 due to the lead of the spiral record groove, namely, by the rotation force of the rotating cylinder 16, an ideal phonograph pickup apparatus wherein the needle 10 is hardly subjected to either the inside force or the outside force is obtained. The present invention, therefore, may be applied to phonograph having a very small vertical force of the needle in the order of only one gram.

When the playing of the record 32 comes to an end, the tone arm 11 may be lifted upward manually and may be turned horizontally toward the edge of the record 32, whereby the roller 66 is inclined with respect to the cylinder 16 and receives from the rotating cylinder 16 a component of rotation force in the direction of the arrow C, and the tone arm 11 may thus be transferred beyond the edge of the record 32.

In addition, according to the present invention, the cylinder 16 is rotated by the endless rope 37 utilizing the rotation force of the turntable 33 which is driven by a motor, and for a phonograph of such type, an arrangement is provided, in general, to minimize the amount of vibration from the motor which is transmitted to the turntable 33. Such arrangement advantageously simplifies the structure when compared with the system wherein the cylinder 16 is driven directly by the motor, since this arrangement does not require a motor to be used exclusively for driving the cylinder, a speed reduction gear and a vibration preventive means, and moreover, reduces to a negligible amount the vibration which is transmitted to the needle 10 from the motor via the cylinder 16, the roller 66, the arm 67, the brackets 60, 14 and the tone arm 11.

In case the endless rope 37 is cut apart for any reason, it will have to be replaced by a new rope. According to the present invention, replacement of the rope is accomplished, as shown in FIG. 4, by the following simple steps, namely, remove the screws 25, 26 and then remove the plate 24 together with the step bearing 23. Then, the cylinder 16 is readily detached so that a new rope may be applied. Thus, the present arrangement is very convenient from the point of practical use, since this arrangement saves some of the steps and the skill required for replacement of such rope in conventional arrangement, which includes loosening the screw 21 which has been appropriately positioned for smooth rotation of the cylinder 16; detaching the cylinder; applying a rope; and then the elaborate re-adjustment of the screw back into the right position.

Another feature of the present invention is, as shown in FIG. 2, the fact that because of the spring 83 provided between the arm 67 and the bracket 60 to press the roller 66 against the rotary cylinder 16 with an appropriate force, even when the cylinder 16 is an eccentric one or has an irregular surface, the result will only be the oscillatory movement of the said arm 67 about its horizontal axis, and will not inflict any ill effect on said bracket 60. Therefore, during the playing of the record 32, there will occur no vibration of the tone arm 11 which will affect the reproduced sound.

Figure 6:
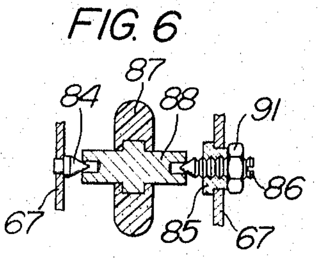

Another feature of the present invention, as shown in FIG. 4, is that small steel balls are used to rotatably support both the roller 66 and the cylinder 16. When the carriage travels due to the horizontal movement of the tone arm 11, the speed of said carirage is proportionate to the rotation speed of the cylinder 16. This means that the greater the rotational speed of the cylinder 16 is, the better effect may be obtained. However, increase in the rotational speed will increase the vibration at the bearings of the roller 66 and the cylinder 16. Such increased vibration will also be transmitted to the needle 10 and will bring forth an undesirable result, that is, a reduction in the signal-noise ratio of the phonograph. Since, in the present invention, small steel balls 30, 31, 72, 73 are used for the bearings of the roller 66 and of the cylinder 16, the friction contact surfaces at these portions can be very small, and accordingly the vibration generated at these portions can also be very small. Thus, the signal-noise ratio of the phonograph at the time the cylinder 16 is rotated at the speed of 100 r.p.m. will be approximately 40 db, which is a value sufficient for practical use. FIG. 6 shows another embodiment of the present invention intended for minimizing the vibration from the bearings for the roller. In this embodiment, a pivot pin 84 is fixed to one side of the arm 67 and a hub 85 having a pivot screw 86 attached therein is secured to the other side of the said arm. The opposite ends of the shaft 88 to which the roller 87 is attached are supported between the said pivot pin 84 and a hub 85. The pivot screw 86 is set by a nut 91 after the said screw is adjusted to permit the smooth rotation of the roller 87. Minimum friction contact surface of the bearings may be obtained also by the above-mentioned arrangement, and thus the vibration from these portions may also be reduced to a negligible amount.

From what has been discussed, it will now be clearly understood that the arrangement for minimizing the vibration from the bearing portions by the use of a pivot pin 84 and a pivot screw 86 for the bearings of the roller 87 may also be applicable to the bearings of the cylinder 16. It should also be clearly understood that this arrangement may be applied to the bearings for the carriage 43 and the bracket 60 instead of the combination of the bearings and the steel balls 63, 64. In this case, the friction resistance arising from their rotation may also be reduced to a negligible amount, and the tone arm 11 will be able to make smooth travel.

The lighter the weight of the cylinder 16, the smaller is the load that works upon the steel balls 30, 31, and as a natural sequence, wear of the bearing portions will be lessened and the vibration from said portions will be reduced. To reduce the weight of the cylinder 16, the use of a material such as plastics having a small specific gravity will afford a good result. However, when a plastic material is used, wear of the conically recessed portions 28, 29 will be intensified due to the relative movement of the conical recesses and the steel balls 30, 31. This may be prevented by attaching the steel balls 30, 31 adhesively to the surfaces of the conical recesses of the cylinder 16, and thus the relative movement of the steel balls 30, 31 and the conical recesses 28, 29 is eliminated. Wear of those portions may be reduced also by the use of the screw 21 and the step bearing 23 both made of a hard material such as steel between which the steel balls 30, 31 are received.

Another feature of the present invention is the provision of the guide rollers 48, 49, 50, 51 for the carriage 43 to be guided along the guide bars 52, 53. This arrangement will afford smooth travel of the carriage 43. By the provision of the spring 83 to press the roller 66 against the cylinder 16 from above position, and by arranging said spring 83 to have a force such that the force of the roller 66 pressing the cylinder 16 will be equal to the total of the weight of the tone arm 11, the counter-weight 15, the brackets 14, 60, the arm 67, the balance weight 79, the roller 66 and the carriage 43, equilibrium between the said total weight and the force of the spring 83 is obtained. In this way, the force which will urge the guide rollers 48, 49, 50, 51 against the guide bars 52, 53 will be made negligible. Thus, the carriage 43 will receive hardly any substantial amount of friction resistance during its travel.

It is apparent that various modifications may be made without departing from the substantial properties of the present invention. The above described examples are intended merely to illustrate some of the important facets in certain selected embodiments of the present invention, and it is to be understood that the scope of the present invention is limited only by the following claims.

What we claim is:

1. A phonograph record playing apparatus having a frame a turntable rotatably mounted on the frame, means to drive said turntable, and a tone arm having a pickup needle at one end thereof; wherein the improvement comprises guide means fixed to said frame; a carriage movable on said guide means in a direction parallel with a line drawn between the pickup needle and the center of a record; a cylinder rotatably mounted on said frame with its longitudinal axis extending parallel with the path of said carriage; bracket means mounted on said carriage for horizontal pivotal movement about a vertical axis, the other end of said tone arm being mounted on said bracket means for vertical pivotal movement about a horizontal axis; a support arm mounted on said bracket means for vertical pivotal movement; a roller rotatably mounted on said support arm with its rotation axis extending perpendicular to a line drawn between said needle and said vertical axis; and resilient means provided between said support arm and said bracket means and urging said roller against the upper portion of said cylinder by a force substantially equal to the total of the weight of said tone arm, said bracket means, said support arm, said roller, and said carriage thereby making negligible the force between said carriage and said guide means due to said total weight, and also reducing friction between the carriage and guide means to a minimum; and means operably connecting said turntable and said cylinder to rotate the latter and said roller so that said roller corrects any inclination of said tone arm and said bracket means about said vertical axis by moving said carriage in response to the component of the rotation force of said cylinder applied to said roller.

2. The apparatus according to claim 1, wherein said means operably connecting said turntable and said cylinder comprises a pulley secured to the spindle of said turntable and a rope connecting said pulley and said cylinder.

3. The apparatus according to claim 2, wherein said pulley and said rope are located below said turntable.

4. The apparatus according to claim 1, wherein said frame includes two side plates and wherein said cylinder is rotatably mounted on said side plates by means of an adjustable bearing means mounted in one of said side plates to rotatably support one end of said cylinder and a pivot means secured to a plate detachably mounted on the other side plate to rotatably support the other end of said cylinder.

5. The apparatus according to claim 4, wherein said bearing means comprises a steel ball disposed between each end of said cylinder and said frame and side plate, respectively.

6. The apparatus according to claim 1, wherein said carriage, said cylinder, said roller and said support arm all extend below said turntable.

References Cited

UNITED STATES PATENTS

| | | | |
|---|---|---|---|
| 3,249,362 | 5/1966 | Rabinow | 274—23.1 |

FOREIGN PATENTS

| | | |
|---|---|---|
| 599,655 | 6/1960 | Canada. |
| 1,171,170 | 5/1964 | Germany. |
| 132,401 | 9/1919 | Great Britain. |

HARRY N. HAROIAN, *Primary Examiner.*

LEONARD FORMAN, *Examiner.*